April 21, 1942.  F. A. FIRESTONE  2,280,226

FLAW DETECTING DEVICE AND MEASURING INSTRUMENT

Filed May 27, 1940  2 Sheets-Sheet 1

Inventor

Floyd A. Firestone.

April 21, 1942.	F. A. FIRESTONE	2,280,226
FLAW DETECTING DEVICE AND MEASURING INSTRUMENT
Filed May 27, 1940	2 Sheets-Sheet 2
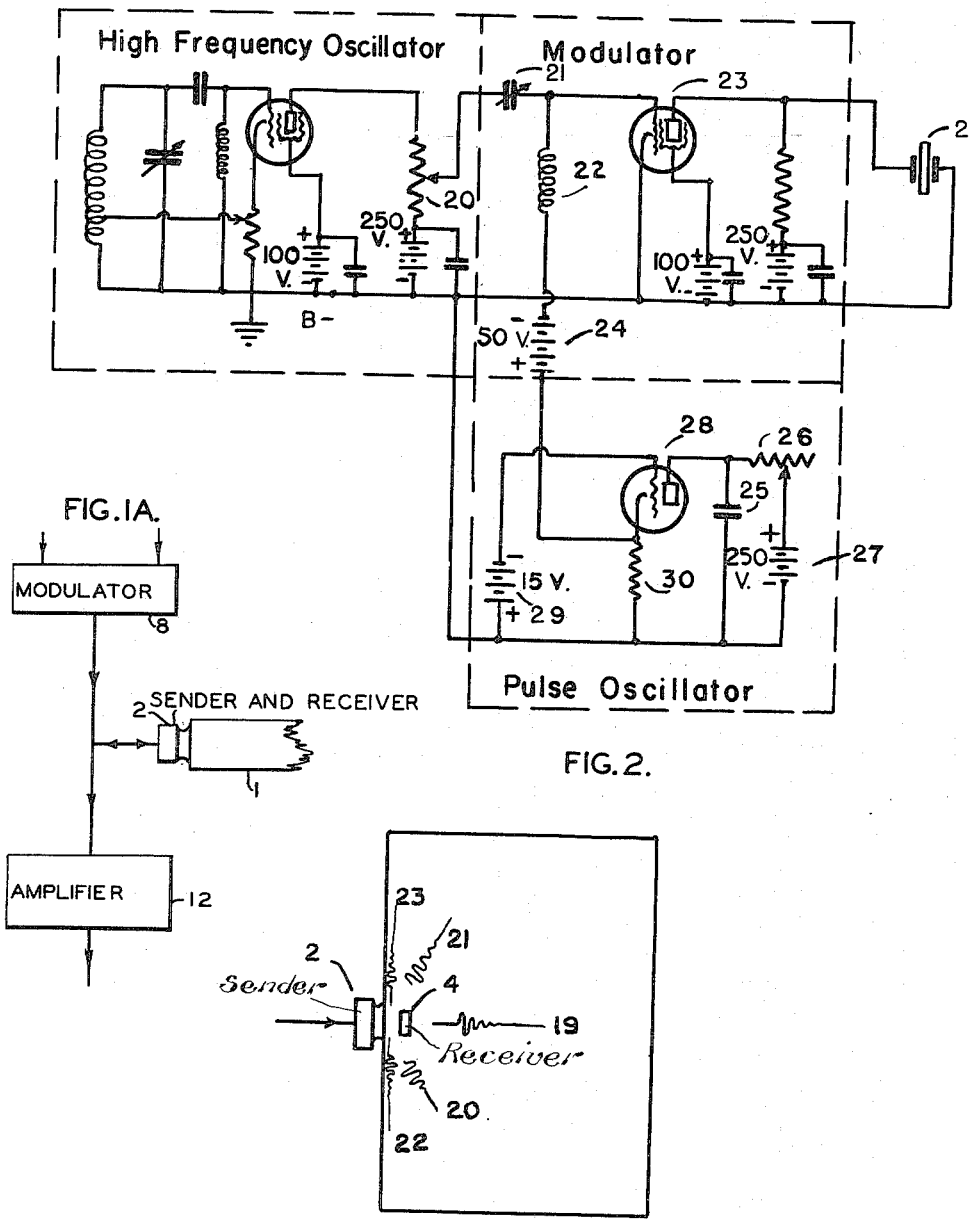
Inventor
Floyd A. Firestone.

Patented Apr. 21, 1942

2,280,226

UNITED STATES PATENT OFFICE 2,280,226

FLAW DETECTING DEVICE AND MEASURING INSTRUMENT

Floyd A. Firestone, Ann Arbor, Mich.

Application May 27, 1940, Serial No. 337,419

11 Claims. (Cl. 250—1)

My invention pertains to a device for detecting the presence of inhomogeneities of density or elasticity in materials. For instance, if a casting has a hole or crack within it, my device enables the presence of the flaw to be detected and its position located, even though the flaw lies entirely within the casting and no portion of it extends out to the surface. My device may also be used for the measurement of the dimensions of objects, and is particularly useful in those cases where one of the faces to which the measurement extends is inaccessible. For instance, the thickness of the wall of a hollow ball or propeller can be measured with my device.

The general principle of my device consists in the sending of high frequency vibrations into the part to be inspected, and the determination of the time intervals of arrival of the direct and reflected vibrations at one or more stations on the surface of the part. If metal parts a few inches long are to be inspected, these reflections will arrive a few millionths of a second after the direct vibration is sent out, and the technique provided by my invention enables these small time intervals to be measured by means suitable for use in production inspection.

The purpose of my invention is to provide a means and method for indicating the presence of inhomogeneities of density or elasticity in materials, especially in those cases where these inhomogeneities are entirely surrounded by a mass of material so that they are not directly accessible; such a means enables parts which are supposed to be homogeneous and free from cracks or holes to be inspected to see if this condition is met.

A further purpose of my invention is to provide a means and method for indicating inhomogeneities of density or elasticity in material by the use of reflected elastic waves, which means and method shall be capable of sufficiently precise determination of short time intervals that pieces whose maximum dimension is even as small as about an inch, may be inspected; furthermore, this means shall be sufficiently rugged and easy of use that it may be utilized in routine production inspection.

A further purpose of my invention is to provide a means for determining the dimensions of a piece even though one of the faces to which the measurement extends should be inaccessible.

It will be evident from noting the above statement of purposes and the examples given, that my invention is particularly and uniquely useful in exploring the interior of parts whose linear dimensions are from fractions of an inch up to the order of ten feet, the speed and consistent accuracy of my indicating devices being such as to make this possible. My invention is therefore not to be confused with so-called "sounding devices" which may be useful for measuring distances of the order of 50 feet up to several miles.

Other objects of my invention will be evident upon reading the remainder of the specification and claims below.

In the accompanying drawings which form part of this specification,

Fig. 1a shows a modification of the block diagram of Fig. 1, wherein a single transducer serves both as sending and receiving transducer.

Fig. 2 shows a detailed wiring diagram of the oscillator, pulse oscillator, and modulator.

Fig. 3 shows the three different forms of elastic waves which travel through a metal plate.

Figure 1:
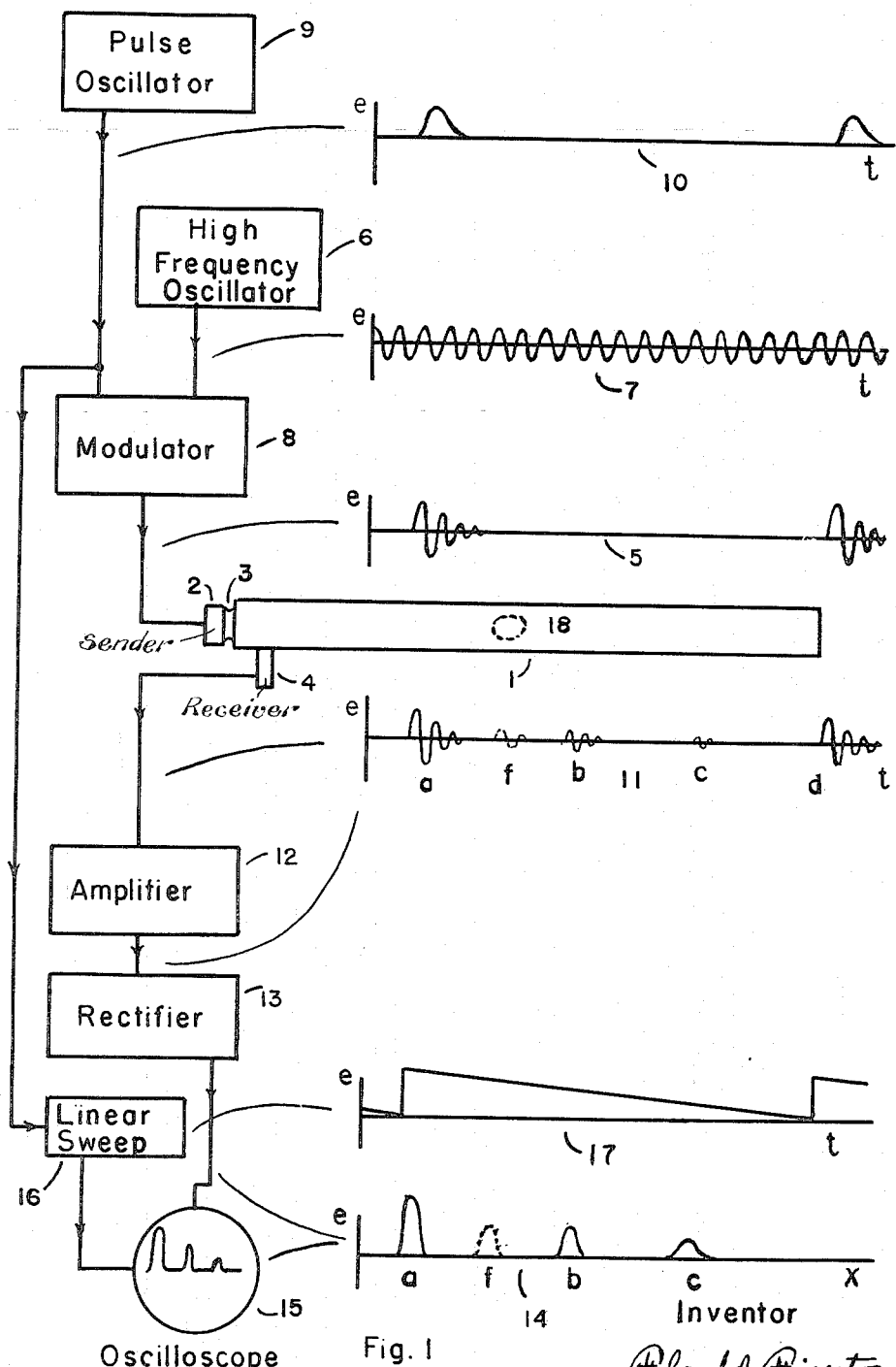
Fig. 1 is a block diagram of a preferred form of apparatus suitable for carrying out my invention. The graphs at the right of this figure show the wave forms of the electric currents flowing through various portions of the circuit.

The general principle of my invention consists in the sending of high frequency vibrations into the part to be inspected, and the determination of the time intervals of arrival of the direct and reflected vibrations at one or more stations on the surface of the part. Referring to Fig. 1, suppose that we are inspecting the bar of metal 1 to see if it contains any hidden flaws or cracks. The piezo-electric quartz sending crystal 2 is attached to the end of the bar by means of a thin film of oil 3. A piezo-electric Rochelle salts receiving crystal 4 is attached to the side of the bar near the sending crystal by means of wax. When the sending crystal 2 is energized by means of a high frequency oscillatory voltage applied to its electrodes, it transmits vibrations into the bar, of wavelength determined by the frequency and the velocity of propagation in the bar. As these vibrations are sent out they shake the receiving crystal 4 and cause it to generate a high frequency oscillatory voltage between its electrodes; waves returning from the distant end of the bar also shake the receiving crystal 4 and generate voltage between its electrodes. In the form of my invention shown in Fig. 1, the high frequency voltage is not fed to the sending crystal 2 continuously, but rather as a series of voltage wave trains as shown in the graph 5 of Fig. 1. These might be 100 of these wave trains per second, the high frequency within each wave train being perhaps 1,000,000 cycles per second, and each wave train being of such a duration that it contained perhaps 10 of the high frequency waves. Such wave trains may be obtained from the high frequency oscillator 6 which feeds a 1,000,000 cycle per second continuous wave as shown in graph 7 to the modulator 8 which also receives from the pulse oscillator 9 a continuous series of short pulses 100 times per second as shown in graph 10; this modulator 8 is so adjusted that it does not pass the high frequency to the crystal 2 except during those intervals when it is receiving a pulse from the pulse oscillator, and thus the wave trains as shown in graph 5 are produced. (A detailed circuit diagram of the pulse oscillator 9, high frequency oscillator 6, and modulator 8 is shown in Fig. 2 and will be explained below.) When these electrical wave trains are converted into vibration by the crystal 2, they travel in the bar 1 as trains of vibration, and if the bar is steel in which the speed of propagation of waves is of the order of 500,000 cm./sec., each of the high frequency waves will be 0.5 cm. long, one wave train of 10 waves will be 5 cm. long, and the individual wave trains in a very long bar would be 5,000 cm. apart. As these waves are sent out by crystal 2, they pass the receiving crystal 4 and generate in it corresponding voltages as shown at $a$ and $d$ in graph 11 of Fig. 1. When a wave train reaches the distant end of the bar it is reflected back toward the sending end, and upon passing the pickup crystal 4, again generates a voltage as shown at $b$ in graph 11. This wave train is then reflected again at the sending end but, if the receiving crystal 4 is quite close to the end, the voltage generated by this reflection will be superimposed on that already shown at $b$. The wave train then travels down the bar and back again, giving rise to the voltage train shown at $c$ in graph 11. There will thus be a series of voltage trains generated in crystal 4, whose time spacing is the time required for a round trip of the waves in bar 1. These reflected wave trains due to a single wave train sent out by sending crystal 2, will be attenuated by internal friction in the bar to negligible proportions before another wave train is sent out; in any case, this desirable condition can be met by making the time between pulses sufficiently long. The voltage output of receiving crystal 4 is then amplified by the linear amplifier 12 which is preferably of the wide range type giving approximately uniform amplification from 1000 to 10,000,000 cycles per second, although for some purposes it may contain a tuning circuit, tuned to the frequency of the high frequency oscillator. The output of the amplifier is preferably passed through the rectifier 13 whose output circuit should have a short time-constant, of the order of .00001 sec. This rectifier gives rise to the envelope of the voltage trains of graph 11, producing voltage pulses as shown in graph 14. The output of this rectifier may be further amplified by a linear amplifier (not shown) and is then fed to the vertical deflecting plates of a cathode ray oscilloscope 15. The horizontal plates of the oscilloscope are connected to the output of the linear sweep oscillator 16 giving an output voltage as shown in graph 17 which causes the oscillographic spot to travel from left to right at constant speed and then suddenly return from right to left. The output of the pulse oscillator 9 is connected to the control circuit of the linear sweep 16 so that the sudden return of the oscillographic spot is produced at the instant that the pulse is sent out. It is not necessary to describe in detail either the oscilloscope or the controlled linear sweep circuit as these are well known items which can be purchased commercially. When the output of the rectifier actuates the vertical motion of the oscillographic spot, while the horizontal motion is at constant speed, a trace appears on the oscillograph screen, as shown in graph 14, the initial wave train being represented at $a$, the first reflection at $b$, and second reflection at $c$. Since this pattern is repeated at the pulse frequency, perhaps 100 times per second, persistence of vision causes the reflection pattern to appear stationary on the screen and its details may be studied at leisure, or photographed.

Since equal distances along the reflection pattern represent equal time intervals, the distance from $a$ to $b$ in graph 14, taken in conjunction with the pulse frequency and the known rate of travel of the wave in the bar, enables the length of the bar to be determined, even though the distant end may be inaccessible. This process may be further simplified if rapid time signals are superimposed on the reflection pattern so as to enable the time interval between $a$ and $b$ to be read off directly.

The above description of the operation of the apparatus of Fig. 1 assumes that the bar is free from flaws, but suppose that about midway along the length of the bar there is a flaw 18 consisting of a crack, hole, or inclusion of foreign matter. This flaw will constitute an inhomogeneity of elasticity and/or density and will therefore give rise to a reflected wave which will arrive back at the receiving crystal 4 much sooner than the wave reflected from the distant end of the bar. This will give rise to an extra wave train $f$ in graph 11 and will produce an extra peak $f$ in the reflection pattern in graph 14, thereby indicating at once the presence of the flaw. If the flaw is at some other place in the bar, the reflection $f$ will be correspondingly displaced. So far as the detection of flaws is concerned, the portion of the reflection pattern lying between $a$ and $b$ of graph 14 is the portion of principal interest; if this portion is free from peaks, it indicates that the bar is free from flaws. While the presence of a flaw may give rise to a series of multiple reflections following $f$, it is sufficient to note the first of these reflections, namely $f$.

The explanation given above was simplified in that it neglected the fact that there are three kinds of waves which travel in a solid, with somewhat different speeds, namely, longitudinal, transverse, and surface waves. Fig. 3 shows these three kinds of waves in a plate of material. If the sending crystal 2 shakes the plate horizontally, a longtudinal wave will be sent out in the direction 19, transverse waves will go out in the directions 20 and 21, while surface waves will run along the surface in directions 22 and 23, as well as in the direction 19. As these different types of wave differ in speed by as much as 30% there may be more than one reflected wave returning from a given reflecting surface, giving rise to a somewhat more complicated reflection pattern than that shown in graph 14. Nevertheless, if the speed of each type of wave is known, the dimensions of the piece can be determined; furthermore, a perfect bar will give rise to an undisturbed portion of the reflection pattern as between $a$ and $b$, while a flaw will give rise to at least one reflection within that portion. In some cases the first reflections are due to but a single type of wave as the other types arrive much later; for instance, in the hollow ball or tube of Fig. 4, the longitudinal wave would be reflected back from the interior surface long before any other reflections might arrive, and the thickness of the wall could be quite easily determined by measurements made on the reflection pattern.

When pieces of irregular shape are to be inspected, the reflection pattern is very complicated, but a satisfactory technique of routine production inspection for flaws in similar parts can usually be worked out by observing the reflection pattern for pieces which are subsequently proved to be without flaws by sawing them open; the appearance of extra peaks in the reflection pattern of a part being inspected, or a complete change in the shape of the pattern, may then be taken as an indication of the presence of at least one flaw.

It is not necessary that the high frequency oscillator should be operated at a resonant frequency of the sending crystal 2 or of the receiving crystal 4. It has been found, for instance, that if the sending crystal has a fundamental resonance frequency of 1,100,000 cycles per second, sufficiently strong waves will be produced if the high frequency oscillator is operated at any frequency from 100,000 up to 1,100,000 cycles per second. Thinner crystals may be used to generate vibrations up to 10 or even 50 megacycles. A wide range of wavelengths for the vibratory waves is therefore available and by taking advantage of the fact that a wave is only feebly reflected from an inhomogeneity whose linear dimensions are smaller than the wavelength, we can choose the wavelength so that only flaws larger than a certain minimum size will be detected. Thus small pinholes in metal may be either detected or passed over, depending on the frequency used in the test.

As in many cases the only portion of graph 14, Fig. 1 which will be of interest is the portion from $a$ to $b$, it may be desirable to use a sweep circuit of a type which will spread that portion over the entire oscilloscope screen, even though the remainder of the graph may be invisible. By this means the resolution and sensitivity of the equipment may be increased.

The circuits for the high frequency oscillator, pulse oscillator, and modulator, are shown in Fig. 2 and will be understood by anyone skilled in the art. The high frequency oscillator is of conventional type and its output feeds from the potentiometer 20 through the condenser 21 past the choke 22 to the control grid of the modulator tube 23. This grid is normally biased so far negative by the battery 24 that no plate current flows in the modulator tube and the high frequency is not repeated through this tube except when a pulse is also received from the pulse oscillator. In the pulse oscillator, the condenser 25 is charged through resistor 26 by battery 27. Tube 28 is of the gas filled or thyratron type and its grid is permanently biased negative by the battery 29 of perhaps 15 volts. No current flows through the tube 28 until the condenser 25 reaches a critical potential at which the tube 28 suddenly becomes highly conducting due to the establishment of an arc therein. The condenser is then suddenly discharged through the tube and the resistor 30, thereby producing on the upper end of the resistor 30, during the discharge period only, a positive potential sufficient to drive the control grid of the modulator 23 into a region where the tube 23 may amplify the high frequency oscillations. Thus the high frequency oscillations are amplified only during that short time during which the condenser 25 is discharging. As soon as condenser 25 is discharged, the tube 28 ceases to conduct and the recharging of the condenser begins. By proper choice of the resistor 26 and grid bias 29, the frequency of the pulse can be adjusted to any desired value. The output of the modulator 23 is connected to the sending crystal 2.

Many variations of the equipment and method described above may be made without departing from the spirit of my invention. Other types of sending and receiving devices may be used in place of the crystals 2 and 4 of Fig. 1; these might be of the magnetostrictive, electrostatic, or electro-magnetic types, especially at frequencies lying near the boundary of the audible and supersonic regions. The receiving crystal need not necessarily be placed beside the sending crystal; or more than one receiving crystal may be used simultaneously, all being connected into the input of amplifier 12. Or if it is desired to pick up the reflections at the sending point, the sending transducer may serve also as receiving transducer. In order to accomplish this it is only necessary to disconnect the two wires from the receiving transducer and connect them across the sending transducer; this results in the sending transducer being simultaneously connected to modulator 8 and to amplifier 12. Wherever the claims specify both a sending transducer and a receiving transducer, it shall be understood that the one structure may as a special case serve the function of both transducers. This arrangement is illustrated in block diagram in Fig. 1a. The rectifier 13 may be omitted, the amplified voltage from the receiving crystal being portrayed directly on the oscilloscope; the spot moves more slowly and its visibility is improved if the rectifier is used and only the envelope of the voltage curve portrayed. By invention may be applied to the investigation of the homogeneity or dimensions of fluids as well as the solids which have been discussed thus far; the technique is simplified in fluids due to the absence of the shear waves. The number of individual waves in a wave train may be reduced till the wave train consists of but one half wave; in this case the high frequency oscillator may be eliminated, the pulse oscillator itself being sufficient to generate the short pulse, provided a small condenser 25 is used. The voltage trains might also be produced by the spark discharge of a condenser through an inductive circuit as in the damped wave wireless telegraph circuits which were used many years ago.

There is considerable latitude of choice as to the position of the receiving transducer relative to the sending transducer, depending on the result which is to be accomplished. For some purposes it is satisfactory to use a single transducer both as sender and receiver as mentioned above. With such an arrangement, one would usually be interested in determining whether there were any inhomogeneities in the part and if so how far they might be from the sending point, or in determining the distance to some face of the part. In this case one observes the time interval between the sending out of the wave train, and the receipts of a reflected wave train. In the oscilloscope pattern, 14 and 15 of Fig. 1, the time when the wave train was sent out is indicated in two ways: first, the oscilloscope spot is at that instant suddenly returned to the left end of the screen (point $a$) through the action of the pulse oscillator on the linear sweep; second, since the modulator is connected to the amplifier, there is a vertical deflection of the oscilloscope spot resulting in an indication $a$. Thus when a reflected wave train returns to the transducer and produces an indication as at $b$, the time interval required by this wave train in making its round trip can be accurately measured as the distance from $a$ to $b$ measured against a suitable time scale which may be introduced into the oscilloscope in well known fashion (or the time marks may be so chosen as to represent distance traveled, directly).

The use of a separate receiving transducer often has advantages, for instance, since the amplifier 12 is no longer connected directly to modulator 8, the amplifier sensitivity is not momentarily impaired by the receipt of the large voltage wave train from the modulation. Nevertheless, the instant when the wave train is emitted by sending transducer 2, is still indicated on the oscilloscope screen by the end of the line at $a$ 14 and furthermore a certain vertical deflection appears at $a$ due to the presence of a small amount of unavoidable coupling between modulator 8 and amplifier 12. When receiving transducer 4 is quite close to sending transducer 2, the supersonic vibration wave passing directly from 2 to 4 produces an additional voltage train which is superimposed upon $a$. With this arrangement, reflections coming back to the receiving transducer will produce indications as at $b$ or $f$ in graph 14 of Fig. 1, and the time interval between $b$ or $f$, and $a$ may be determined as before.

If, now, the receiving transducer 4 contacts the part at a considerable distance from the sending transducer 2, the indication $a$ will still be present at the end of the line on the oscilloscope due to unavoidable coupling between the modulator and amplifier (more coupling can be provided if desired), but the indication due to the direct vibration wave train from the sending transducer 2 to the receiving transducer 4 will be somewhat to the right of $a$ and the indication from any reflections will lie still farther to the right. The time intervals between any of these indications may be determined, and may aid in the location of the inhomogeneity producing the deflection.

In the last case, the receiving transducer may be at the point most distant from the sending transducer, as on the opposite end of the bar 1. This would be a useful arrangement if one were measuring the length of the bar (which might be difficult to do with ordinary measuring methods because the bar might be coiled up at the time). The indication $a$ would appear at the end of the line on the oscilloscope, for reasons given above, and the length of the bar could be found by noting the time interval until the receipt of the direct wave by the receiving transducer. Of course the length of the bar could also be found by using only a single transducer, and noting the time between the sending out of the wave train, and the receipt of the reflected wave train from the distant end.

Wherever, in the claims, reference is made to "supersonic" waves, voltages, or vibrations, these shall be understood to be waves, voltages, or vibrations of fundamental frequencies in excess of the audible frequencies, that is, above about 15,000 cycles per second. In case a wave train consists of but one-half a wave, it shall be considered supersonic if the period of the half wave is 1/30,000 sec. or less. An electro-mechanical transducer shall be understood to be a device for translating electrical currents or voltages into corresponding mechanical waves or vibrations, or vice versa; for example, the sending crystal 2 or receiving crystal 4. Wherever the expression "wave train" or "voltage train" appears, it shall be understood to refer to a number of successive cycles of vibration or voltage, preceded and followed by essentially no vibration or voltage fluctuation; the number of cycles in a wave train may be any number from one half up to a large number; the total length of a "wave train" is usually less than the longest dimension of the piece in which it travels. Wherever the word "part" appears in the claims, it shall refer to a bounded piece of solid under test, or a portion of liquid or gas enclosed in a container.

I claim:

1. In a device for the interior inspection, exploration, or measurement of a solid part whose maximum dimension is of the order of 10 feet or less, by means of supersonic vibration waves—the combination of means for transmitting a supersonic wave train into said part, and means for determining the time interval between the sending out of said wave train and the arrival of said wave train at some point of the part.

2. In a device for the interior inspection, exploration, or measurement of a solid part whose maximum dimension is of the order of 10 feet or less, by means of supersonic vibration waves—the combination of means for transmitting a supersonic wave train into said part, and means for determining the time interval between the sending out of said wave train and the arrival of said wave train at some point of the part after having been reflected from some portion of said part.

3. In a device for the interior inspection, exploration, or measurement of a solid part whose maximum dimension is of the order of 10 feet or less, by means of supersonic vibration waves—the combination of means for transmitting a supersonic wave train into said part, and means for determining the time interval between the arrival of a pair of wave trains arriving at some point of said part.

4. In a device for the interior inspection, exploration, or mesurement, of a solid part whose maximum dimension is of the order of 10 feet or less, the combination of means for generating a supersonic electrical voltage train, an electro-mechanical sending transducer energized by the aforesaid voltage train and having its sensitive area in effective contact with said part so as to radiate a supersonic vibration wave train into said part, an electro-mechanical receiving transducer having its sensitive area in effective contact with said part so as to be actuated by supersonic vibration wave trains in said part and generating voltage trains in response to said wave trains, a sweep circuit synchronized with said electrical voltage wave train generating means first mentioned, and an oscilloscope whose spot is deflected in one direction by said sweep circuit and is deflected in a different direction by the voltage output from said receiving transducer.

5. In a device for the exploration or measurement of a bounded part by means of supersonic vibration waves, the combination of a voltage pulse oscillator, a high frequency oscillator generating alternating voltage of supersonic frequency, a modulator generating a voltage train by passing said high frequency voltage only during the period that the modulator is receiving a pulse from the voltage pulse oscillator aforesaid, an electro-mechanical sending transducer energized by the aforesaid voltage train and having its sensitive area in effective contact with said part so as to radiate a supersonic vibration wave train into said part, an electro-mechanical receiving transducer having its sensitive area in effective contact with said part so as to be actuated by vibration wave trains in said part and generating voltage trains in response to said wave trains, and electrical means for determining the time interval between any of the aforementioned voltage trains which are produced by a single pulse from said pulse oscillator.

6. In a device for the exploration or measurement of a bounded part by means of supersonic vibration waves, the combination of a voltage pulse oscillator, a high frequency oscillator generating alternating voltage of supersonic frequency, a modulator generating a voltage train by passing said high frequency voltage only during the period that the modulator is receiving a pulse from said voltage pulse oscillator, an electro-mechanical sending transducer energized by the aforesaid voltage train and having its sensitive area in effective contact with said part so as to radiate a supersonic vibration wave train into said part, an electro-mechanical receiving transducer having its sensitive area in effective contact with said part so as to be actuated by vibration wave trains in said part and generating voltage trains in response to said wave trains, a sweep circuit synchronized with said voltage pulse oscillator first mentioned, and an oscilloscope whose spot is deflected in one direction by said sweep circuit and is deflected in a different direction by the voltage output from said receiving transducer.

7. An invention as defined in claim 5 except that the part is a bounded metal part.

8. An invention as defined in claim 6 except that the part is a bounded metal part.

9. An invention as defined in claim 1 except that the maximum dimension of the part is of the order of magnitude of an inch.

10. An invention as defined in claim 2 except that the maximum dimension of the part is of the order of magnitude of an inch.

11. An invention as defined in claim 3 except that the maximum dimension of the part is of the order of magnitude of an inch.

FLOYD A. FIRESTONE.